Sept. 18, 1934. A. BOUWERS 1,974,328
VOLTAGE MULTIPLIER
Filed July 15, 1933    2 Sheets-Sheet 2

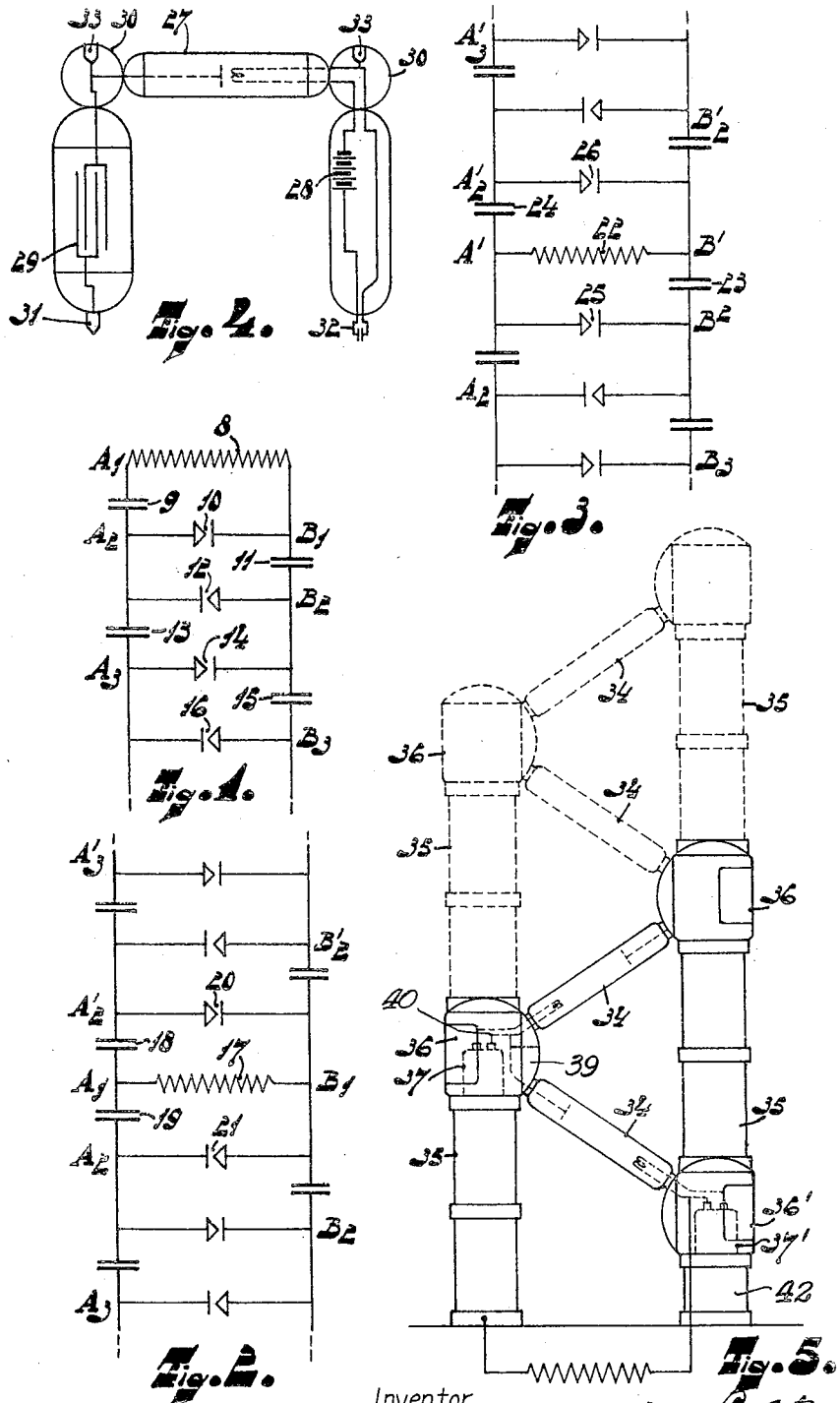

Inventor
ALBERT BOUWERS
By
Attorney.

Patented Sept. 18, 1934

1,974,328

UNITED STATES PATENT OFFICE 1,974,328

VOLTAGE MULTIPLIER

Albert Bouwers, Eindhoven, Netherlands, assignor, by mesne assignments, to N. V. Philips' Gloeilampenfabrieken, Eindhoven, Netherlands, a Dutch company Application July 15, 1933, Serial No. 680,602 In Germany July 13, 1932

11 Claims. (Cl. 175—363)

The present invention relates to so-called voltage multipliers, by means of which the voltage obtained from an alternating current supply is converted into a unidirectional voltage and then increased or multiplied by means of circuit arrangements comprising condensers and rectifiers.

There are several known circuit arrangements of this type, which are used, for instance, in X-ray installations and by means of which the voltage supplied from a transformer is rectified and increased to the double or threefold value of the transformer voltage.

Also, in connection with experiments requiring extremely high voltages, for instance, with those relating to the destruction of the atom, such circuits are used to good advantage.

For the latter purpose it has been already suggested to carry this increase or multiplication of the voltage even further, by so interconnecting a plurality of groups, each of which comprises a condenser and a rectifying valve, that the voltages to which the condensers of successive groups or stages are charged up are additive, whereby thus extremely high voltages can be obtained, which equal the sum of the individual condenser voltages.

The present invention relates to arrangements of the above type and particularly to such arrangements in which a comparatively large number of groups or circuit branches are or may be used.

One object of the invention is to provide a unitary and self-contained construction, which comprises all of the instrumentalities of one branch circuit or stage of the arrangement.

A further object of the invention is to build up such a voltage multiplier system from standard self-contained units, which units can be interconnected in any number and order, and in which the interconnection and disconnection of the units can be effected quickly and in a simple manner.

A further object of the invention is to employ as rectifiers, hot cathode discharge tubes and to provide within the unit an independent source for the heating of the rectifier cathode.

A further object of the invention is to automatically close the heating circuit of the rectifier cathode when the unit is connected in a circuit arrangement and interrupt same when the unit is disconnected.

Various other objects of my invention will appear as the specification progresses.

My invention has various important advantages over the devices previously used in such arrangements. For instance, in previous arrangements the heating current for the cathodes was supplied by one or more transformers, which introduced various complications.

Between the cathodes of the individual rectifier tubes, high potential differences exist, which require not only a careful insulation of the transformer windings for the individual cathodes from each other as well as from ground, but due to the high voltage required, necessitates, for the supply of the heating current, the cascading of a plurality of transformers or at any rate requires expensive heating transformers.

Furthermore, in the connecting of the heating circuits, the interconnection of the main circuits has to be considered, which deprives the system of flexibility.

In my invention, all these drawbacks are obviated; each unit is provided with its own electrical source for the supply of the heating current for its rectifier cathode, and thus the heating circuits of the cathodes are independent of each other as well as of the main circuits.

This source of current is preferably a battery of any kind, for example a storage battery which is contained in the unit and the dimensions and capacity of which is comparatively small. For instance, when using hot cathode, gasfilled rectifier tubes having a highly emitting cathode, for instance, an oxide cathode, it is sufficient for the battery to supply about 5 to 10 watts. As batteries, I prefer to use accumulators but primary batteries such as dry cells may also be employed.

Instead of using individual batteries as the current supply for the heating of the rectifier cathodes, other small individual current generators may be used.

A further advantage of my invention is that by using self-contained, symmetrical and interchangeable units, these units may be interconnected in any order without regard to circuit connections, insulation, etc.

The number of units can be easily varied and thus within wide limits any desired voltage can be obtained.

Furthermore, the connections of the devices forming the units are permanent and well protected, whereas for the interconnections of different units connectors are provided by means of which the units can be simply plugged into each other.

According to a further feature of my invention, the heating circuit of the rectifier cathode is automatically interrupted when the unit is not in use, and automatically established when it is connected to another unit. For this purpose the electric connecting means between the individual units are so constructed that the connecting members on the cathode side of the units also control the heating circuit.

In order that the invention may be clearly understood and readily carried into effect, some embodiments of my invention will be described in connection with certain typical arrangements.

In the drawings forming part of this specification, Figs. 1, 2 and 3 are diagrams of typical circuit arrangements to which my invention may be advantageously applied.

Fig. 4 is a diagrammatic illustration of an embodiment of my invention showing a self-contained unit comprising all of the devices required in a branch circuit or stage of an arrangement of the general type shown in Figs. 1 to 3.

Fig. 5 is a diagrammatic illustration of an assembly of a plurality of units of a somewhat modified construction.

Figure 6:
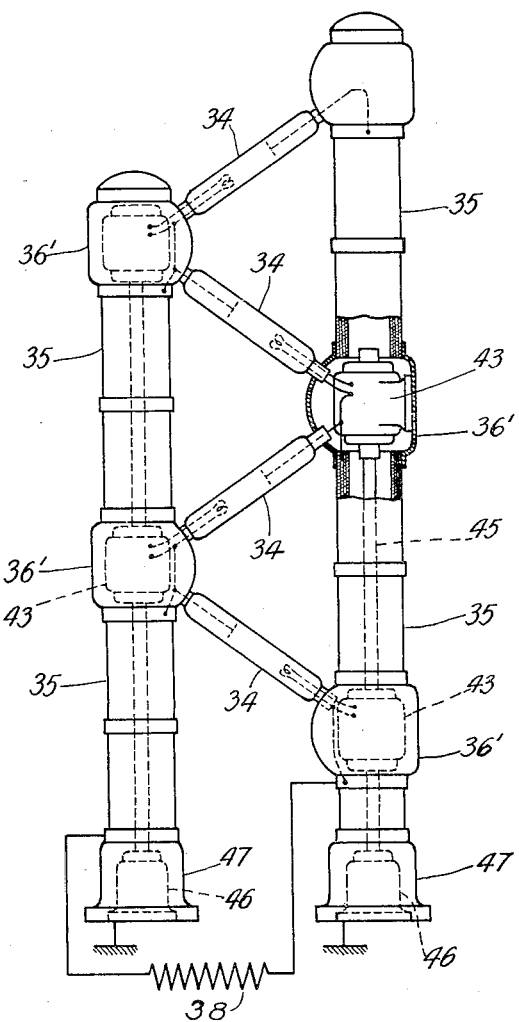
Fig. 6 is a diagrammatic illustration, partly in section, of an assembly similar to that of Fig. 5, using electric generators as the source of electric energy.

Referring to Fig. 1, a transformer winding 8 supplies the alternating current for the circuit arrangement, the two ends of the winding being marked $A_1$ and $B_1$. Connected between points $A_1$ and $B_1$ of the winding 8 is a circuit branch comprising a condenser 9 and a rectifier 10.

The rectifier 10 is shown as being connected with its anode to the point $B_1$, and with its cathode to the condenser 9, this junction point being marked $A_2$.

For the sake of clarity, the heating circuits of the rectifier cathodes are omitted from the drawings.

Connecting across the rectifier 10 is a second branch circuit comprising a condenser 11 and a rectifier 12; the condenser 11 is connected with one electrode to point $B_1$, and with its other electrode at $B_2$ with the cathode of the rectifier 12, the anode of which is connected to the point $A_2$.

Across the rectifier 12 is connected a third branch circuit comprising a condenser 13 and a rectifier 14. The anode of the rectifier 14 is connected at $B_2$, whereas the cathode of the rectifier joins the condenser 13 at $A_3$ and the other electrode of the condenser is connected to $A_2$.

Across the rectifier 14 is a fourth branch circuit. The condenser 15 of this branch is connected with one electrode to $B_2$ and with the other electrode at $B_3$ to the cathode of the rectifier 16, the anode of which is connected to $A_3$.

It should be well understood that any number of branch circuits may be added in a similar manner.

If V is the maximum value of the alternating voltage at the terminals of the transformer winding 8, the condenser 9 will be charged up to a voltage V.

Between the points $A_2$ and $B_1$, a voltage difference is established which varies between the values O and 2V.

This latter potential difference causes now the condenser 11 to charge up to a voltage 2V. Similarly, the condensers of any further branch will be charged up to a voltage 2V.

As long as no current is drawn from the system, the condensers once charged retain their charges and it is thus possible to obtain between any two of the points $A_1$, $A_2$, $A_3$, etc. or any two of the points $B_1$, $B_2$, $B_3$, etc., a direct voltage of constant value.

These voltages also remain substantially constant as long as the current drain from the system is not excessive, which requirement is complied with as a rule in such arrangements.

If the number of branch circuits, or stages is $n$ (including the branch comprising the condenser 9 and rectifier 10), for an even number of stages, a voltage $nV$ can be obtained between the corresponding points B, and similarly for an odd number of stages, a voltage $nV$ can be obtained between the corresponding points A.

Between any point A and an adjoining point B, a pulsating voltage exists, which pulsates between two values differing from each other by 2V.

Figure 2 shows a somewhat different arrangement, which is generally referred to as the Greinacher circuit. In this arrangement there are two branch circuits connected across the terminals $A_1$ and $B_1$ of the transformer winding 17, and to each of these circuits there are connected further branch circuits to obtain a cascading similar to that shown in the arrangement of Fig. 1. Thereby one of the branch circuits connected across the winding 17, has the anode of its rectifier 20 connected with the terminal $B_1$ and the other of these branch circuits has the cathode of its rectifier 21 connected to this point.

The condenser 18 of the first circuit is connected with one electrode to the point $A_1$ and with the other electrode to the cathode of rectifier 20 at the junction point $A'_2$.

The condenser 19 of the second circuit is similarly connected with the terminal $A_1$ and is connected with its other electrode at $A_2$ to the anode of the rectifier 21.

The interconnection of further branch circuits with each of the above circuits is obtained in the same way as has been explained in connection with Fig. 1.

With this arrangement between the points $A_2$ and $A'_2$ a voltage of 2 V will prevail, and between the points $A'_2$ and $A_3$ a voltage of 4 V, etc. A pulsating voltage can be obtained from this system between any point A and B in the same manner as explained in connection with Fig. 1.

In Fig. 3 is shown an arrangement generally referred to as the Witka circuit, which differs from that shown in Fig. 2 only in the connections of the two circuits which are directly connected across the terminals of the transformer winding 22.

In this case, one of these branch circuits is connected with the cathode of its rectifier 25 to the terminal $A_1$ and the anode of the rectifier 25 is connected at $B_2$ with one electrode of a condenser 23, the other electrode of which is connected to the winding terminal $B_1$. To the terminal $B_1$ is connected the anode of the rectifier 26 of the other of these branch circuits and the cathode of the rectifier 26 is connected at $A'_2$ to one electrode of a condenser 24, the other electrode of which is connected to $A_1$. The further cascading of the branch circuits is provided in the same way as in the previous arrangements.

The arrangement of Fig. 3 makes it possible to obtain a higher voltage with the same number of branch circuits than is possible with the arrangement of Fig. 2. For instance, if the number of groups is $n$, and $n$ is an even number, a pulsating voltage of the value $(n+1)$ V between a point A and a point B can be obtained. For example, between the points $A'_3$ and $B_3$ the voltage obtained is 7 V. If the number $n$ is odd the voltage obtained is $n$V.

Figure 4 illustrates a construction according to my invention. This provides for a self-contained unit which comprises all of the instrumentalities of a branch circuit or stage and which can be used for any stage of any one of the circuit arrangements of Figs. 1 to 3 or of circuits of the same type.

The unit comprises a rectifier tube 27, a battery 28 and a condenser 29, and suitable connecting means, the whole unit having the general shape of an inverted U.

The rectifier is preferably a gas-filled incandescible discharge tube, having an oxide cathode and being of a type adapted for high voltage rectification.

The battery 28 is disposed on the cathode side of the tube in a suitable housing and is connected across the two ends of the cathode to supply the heating current.

The condenser 29 is a suitable high-voltage condenser and is disposed on the anode side of the rectifier tube 27, and is electrically connected with the anode.

The conductors connecting the tube 27 with the condenser 29 and battery 28 respectively, are surrounded by metallic housings 30 having preferably a spherical shape, and the conductor between condenser 29 and the tube 27 and one of the conductors between the battery 28 and the tube 27 are also electrically connected to their respective housings. The spherical shape of the connectors is for the purpose of avoiding spark discharges between the terminals. The condenser 29, the rectifier tube 27 and the battery 28 are surrounded by rounded envelopes for similar reasons. As shown in the drawings, the spherical bodies 30 and the housings of the condenser and of the battery may be mechanically interconnected and secured to the tube 27 to form a unitary structure.

At their free ends, shown as the lower ends, the condenser 29 and the battery 28 are provided with contact pins 31 and 32 respectively; whereas the housings 30 are provided at the top with contact sockets 33 to receive the pins 31 and 32 of an adjoining unit.

As the condenser 29 and battery 28 form two legs of the unit and are of equal length, and as the individual units are plugged into each other, the assembly of such units into groups is rendered quite simple and results in a symmetrical assembly irrespective of the number of units.

The heating circuit of the cathode is preferably interrupted by a gap of the contact pin 32 of the battery 28; however, when the pin 32 is plugged into the socket 33 of an adjoining unit this gap is bridged and the heating circuit is automatically closed.

It will be noted that irrespective of which way the units are connected and irrespective of their number, each unit will be subjected to the same voltage difference of 2 V, and thus each unit will be subjected to the same electrical stress. Of course provision has to be made to properly insulate from ground the whole assembly for a voltage corresponding to the maximum voltage of the assembly.

Fig. 5 shows an assembly of a plurality of units, the individual units representing a modified construction of my invention.

The devices of a group consist of the rectifier 34, the condenser 35, and the battery 37, which is housed in a metallic housing 36.

As the battery can be, as a rule, considerably smaller than the condenser, in the present construction the battery housing 36 is made much shorter than the condenser 35. While this provides for an asymmetrical unit, the assembly is substantially symmetrical.

Considering the units shown at the lower left-hand corner of the drawings, it will be seen that the battery housing 36 is provided on the top of the condenser 35, the metallic housing 36 being electrically connected to one of the electrodes of the condenser.

The housing 36 is provided with a semi-spherical connector 39 to which is also connected one of the battery leads 40. Secured to the connector 39 is the anode of the inclinedly disposed rectifier tube.

The cathode of the rectifier 34 is heated from the battery of an adjoining unit. In the case of the unit just under consideration, which is the first unit, however, a separate battery 37' and battery housing 36' are to be provided, which is supported by a distance piece 42; however, the heating of the cathode of a rectifier tube from the battery of the adjoining unit is shown for the second rectifier tube.

The battery lead 41 connecting the other end of the filamentary cathode to the battery 37 is insulated from the connector 39 and the battery housing 36.

A transformer winding 38 supplies the alternating current and is connected with its two ends to one electrode of the condenser 35 and the cathode of the rectifier 34 of the first stage.

Instead of providing batteries for the individual supply of the heating current for the rectifier cathodes, other suitable individual sources of electrical energy may be used. For instance, instead of the individual batteries 28, there may be provided, as shown in Fig. 6, small individual electric generators 43 as the source for heating the cathodes of the rectifiers. The generators 43 are provided in metal housings 36' and the generators 43 of the individual units are interconnected by a shaft 45 of insulating material disposed, for example, coaxially with the condensers 35. This shaft 45 is driven by a motor 46 mounted on a foot-piece 47 provided at one end of the column. As a rule, however, in view of the comparatively small current consumption involved and the greater freedom obtained, I prefer to use individual batteries for the supply of the heating current.

While I have described my invention on hand of specific embodiments and in specific applications, I do not wish to be limited to same, but desire the appended claims to be construed as broadly as permissible in view of the prior art.

What I claim is:—

1. In a circuit arrangement for voltage multiplication, an assembly of a plurality of units, each unit comprising a condenser, a rectifying discharge tube having an anode and an incandescible cathode, an individual battery for heating the cathode, and a housing for said battery, said assembly forming two columns, each comprising alternate condensers and housings, said rectifier tubes being disposed between said columns in a zigzag manner.

2. A device for obtaining high direct voltages from a source of alternating voltage, comprising a source of alternating voltage and a circuit arrangement connected across said alternating source, said circuit arrangement comprising a plurality of stages, said stages forming interchangeable units, each unit comprising a hot-cathode rectifier discharge tube, a condenser and a source of current for said cathode, said rectifier, condenser and source being fixedly interconnected with each other, and connecting means on each of said units for the mechanical and electrical interconnection of said units in any order and number.

3. A device for obtaining high direct voltages from a source of alternating voltage comprising two columns, each consisting of a plurality of series-connected cylindrical condensers, mounted one above the other in coaxial relation and interconnected electrically and mechanically by hollow metal members, the number of the condensers of one column being at the most one more than that of the other column, each of the said hollow metal members being situated half way the height of the condenser of the opposite column, and containing a source of current, and gasfilled electric discharge tubes having an anode and an incandescible cathode connecting each of the said members with the extremities of the condenser in front of it and being arranged in a zigzag manner and series connected, the cathodes of said discharge tubes being connected to said sources of current so as to be energized thereby, the said source of alternating current being connected between the lowermost condenser and that hollow metal member of the opposite column lying in front of said latter condenser.

4. A device for obtaining high direct voltages from a source of alternating voltage comprising two columns, each consisting of a foot piece and a plurality of series-connected cylindrical condensers mounted one in line with the other and interconnected electrically and mechanically by hollow metal members, each of the said hollow metal members comprising an electric dynamo, a driving motor for the dynamos arranged at the foot of the columns and connected by means of insulating spindles extending upwards from the foot along the column to the dynamos, and a plurality of electric discharge rectifier tubes having filamentary cathodes mounted in series between the lowermost hollow metal member and the upper extremity of the uppermost condenser, successive joining points between the rectifiers being connected with successive joining points of the condensers alternately of one and the other column, the cathode of the rectifiers being connected to the adjacent dynamos so as to be energized thereby.

5. A device for obtaining high direct voltages from a source of alternating voltage comprising two columns, each consisting of a plurality of hollow cylindrical condensers and joints therefor in the form of metal boxes, and electric discharge rectifier tubes with an anode and a filamentary cathode connecting each joint of two condensers to the extremities of a condenser of the opposite column, thereby being mutually connected in series, the metal boxes comprising dynamos for energizing the cathodes of the rectifier tubes connected to the surrounding box, the dynamos of one column being interconnected by insulating spindles located in the hollow condensers and a motor driving the group formed by the dynamos and spindles of one column.

6. In a voltage multiplier as an element forming a multiplying stage, a unit comprising a rectifier tube having an anode and an incandescible cathode, a condenser connected to said anode, and an individual source of current supply, said tube, condenser and source being mechanically secured together to form a structural unit having leg portions, the free ends of which are spaced apart and are provided with contact terminals for the condenser and one electrode of the tube, respectively, the unit being provided intermediate the free ends of said leg portions with another contact terminal common to said condenser and tube.

7. A device for obtaining high direct voltages from a source of alternating voltage comprising a source of alternating voltage and two parallel columns, each column comprising a plurality of series-connected condensers mounted one above the other, metal connecting members electrically and mechanically interconnecting said condensers, the number of the condensers of one column being at least equal to and at the most one more than that of the other column, the connecting members of one column opposing the middle portions of the condensers of the other column, and a plurality of series-connected high voltage rectifiers, the number of which equals the sum of the condensers of the two columns, each connecting member being connected by two successive rectifiers across the ends of the opposing condenser, the said source of alternating voltage being connected across the lower ends of the bottom condensers of the two columns.

8. A device for obtaining high direct voltages from an alternating voltage source comprising two parallel sectional structures each consisting of a plurality of series-connected condensers, a conductive connecting member electrically and mechanically connecting adjacent condensers of each structure, a terminal member connected to the free end of each end-condenser of one of said structures, a terminal member connected to the free end of one end-condenser of the other structure, rectifier tubes having an anode and a cathode, said tubes being connected to said conductive members, to form a series in which successive rectifiers are in opposite connection, said rectifiers being disposed in zig-zag arrangement.

9. A device for obtaining high direct voltages from a source of alternating voltage comprising a column consisting of a plurality of series-connected condensers, conductive connecting members electrically and mechanically interconnecting said condensers, the uppermost of said condensers being provided with a conductive end-member and the lowermost of said condensers being provided with a conductive pedestal-member, a second column having a plurality of series-connected condensers at least equal in number and at the most one more than that of the first column, and having conductive end and pedestal members, and a plurality of series-connected high-voltage rectifiers equal in number to the sum of the condensers of both columns, the first of said rectifiers connecting the end members of said columns and the second of said rectifiers connecting one of said end members to the uppermost connecting member of the opposite column and so forth, the connecting member to which the last rectifier is connected being interconnected therethrough with the pedestal-member of the other column, said rectifiers being thus supported by the said conductive members and mechanically and electrically connecting said columns of condensers.

10. A device for obtaining high direct voltages from a source of alternating voltage comprising a plurality of discharge rectifier tubes each having a filamentary cathode and an anode, conductive connecting members to mechanically and electrically connect said tubes in series arrangement, and conductive end members at the ends of the series, condensers interposed between each pair of conductive members, each conductive member with the exception of the lower end member and the lower connecting member being mounted above the second following conductive member and spaced therefrom by one of said condensers, another condenser supporting said lower connecting member, the lower end member and the lower connecting member being interconnected through said source of alternating voltage in series with said last-mentioned condenser, each of said conductive connecting members being connected to a cathode of one of said tubes, and a source of heating current for the cathode of each of said tubes.

11. A device for obtaining high direct voltages from a source of alternating voltage comprising condensers having substantially cylindrical housings and rectifiers of substantially cylindrical shape arranged in a structure in which the condensers form two columns disposed side by side, hollow members interposed between adjacent condensers of a column, said members mechanically and electrically interconnecting adjacent condensers of a column, to connect them in series arrangement, said rectifiers being mechanically and electrically connected with one of their ends to a member of one column, and with their other end to a member of the other column, adjacent rectifiers being arranged in opposite series connection with each other, said members having means adapted to be connected with one end of each of two adjacent rectifiers, the other ends of said rectifiers being adapted to be connected to successive members of the other column.

ALBERT BOUWERS.